United States Patent
Takada

Patent Number: 6,102,276
Date of Patent: Aug. 15, 2000

[54] PRESSURE WELDING APPARATUS AND PRESSURE WELDING METHOD

[75] Inventor: Kazuhiko Takada, Shizuoka, Japan

[73] Assignee: Yazaki Corporation, Tokyo, Japan

[21] Appl. No.: 09/432,164

[22] Filed: Nov. 2, 1999

Related U.S. Application Data

[62] Division of application No. 08/870,289, Jun. 6, 1997, Pat. No. 5,996,879.

[30] Foreign Application Priority Data

Jul. 18, 1996 [JP] Japan .................................. 8-189511

[51] Int. Cl.$^7$ ............................. B23K 20/12; B23K 31/00
[52] U.S. Cl. .................. 228/235.1; 228/115; 228/179.1; 29/753
[58] Field of Search .............................. 228/179.1, 234.1, 228/235.1, 44.7, 115, 212, 180.1, 173.5; 29/868, 857, 861, 806, 877, 753, 749, 505, 515, 520, 559

[56] References Cited

U.S. PATENT DOCUMENTS

| | | | |
|---|---|---|---|
| 3,823,863 | 7/1974 | Piechocki | 228/6 |
| 4,343,085 | 8/1982 | Lucius et al. | 29/866 |
| 4,773,876 | 9/1988 | Nakamura et al. | 439/417 |
| 4,922,072 | 5/1990 | Topel et al. | 219/56.1 |
| 4,991,289 | 2/1991 | French | 29/863 |
| 5,415,562 | 5/1995 | Matsumoto et al. | 439/397 |
| 5,611,141 | 3/1997 | Takada et al. | 29/861 |
| 5,667,131 | 9/1997 | Sugiyama | 228/173.5 |
| 5,671,528 | 9/1997 | Endo et al. | 29/753 |
| 5,694,681 | 12/1997 | Hatagishi et al. | 29/857 |
| 5,771,574 | 6/1998 | Kato et al. | 29/861 |
| 5,895,027 | 4/1999 | Yagi | 251/129.15 |
| 5,913,553 | 6/1999 | Takada | 29/861 |
| 5,967,399 | 10/1999 | Takada | 228/115 |

FOREIGN PATENT DOCUMENTS

| | | |
|---|---|---|
| 7-161437 | 6/1995 | Japan . |
| 7-296933 | 11/1995 | Japan . |
| 8-213139 | 8/1996 | Japan . |
| 409306257A | 11/1997 | Japan . |
| 410154567A | 6/1998 | Japan . |

*Primary Examiner*—Patrick Ryan
*Assistant Examiner*—Kiley Stoner
*Attorney, Agent, or Firm*—Armstrong, Westerman, Hattori, McLeland & Naughton

[57] ABSTRACT

Electric wires of a double-sided solderless connector are pressure-welded. The method of the pressure-welding includes the steps of: locating a pressure welding blade and support blade on both sides of a double-sided solderless connector, in a face to face relationship, so as to be movable in vertical direction; supporting one side of said double-sided solderless connector with said support blade; and pressure-welding respective electric wires to terminals at the other side of said double-sided solderless connector with said pressure welding blade.

2 Claims, 7 Drawing Sheets

PRESSURE WELDING APPARATUS AND PRESSURE WELDING METHOD

This application is a divisional of Ser. No. 08/870,289 filed Jun. 6, 1997, now U.S. Pat. No. 5,996,879.

BACKGROUND OF THE INVENTION

1. Field of the Invention

The present invention relates to a pressure welding apparatus and a method for pressure-welding an electric wire to a pressure welding terminal in a double-sided solderless connector quickly and surely according to various wire-diameters.

2. Description of the Prior Art

FIG. 7 shows a conventional pressure welding means, wherein a solderless connector 46 is fixed on a base table 65 and an electric wire 67 is pressure-welded to a pressure welding terminal 36 in the solderless connector 46 by a pressure welding blade 66. The solderless connector 46 is a double-sided solderless connector having the pressure welding terminals 36 on both the upper and lower sides thereof, and after the electric wires 67 have been pressure-welded to all the pressure welding terminals 36 in upper receiving chambers 68, the electric wires 67 are pressure-welded likewise to the lower pressure welding terminals 36 after turning one side of the connector 46 to the other side. The electric wire 67 is relatively easily led to the terminal 36 due to a partition 47 between adjoining terminals.

However, in case of the pressure welding means shown in FIG. 7, it has been a bothersome work to change the pressure welding blade 66 at each time of working according to kind (diameter) of electric wire 67. And, there has been a problem such that the pressure welding has resulted in imperfect connection caused by insufficient stroke of the pressure welding blade 66 due to a downward deflection of a bottom plate 38 of the solderless connector 46 by pressure.

Further, FIGS. 8 and 9 show an example of the conventional pressure welding of an electric wire 70 to a solderless connector 69 with a wire guide 68, wherein a pair of horizontal wire guides 68 are arranged on a partition 71 of the connector 69 and the electric wire 70 inserted into the pair of wire guides 68 is pressure-welded as being guided along the wire guides 68 to a pressure welding terminal 73 by a pressure welding blade 72.

However, there has been a problem that the structure shown in FIGS. 8 and 9 is not applicable to a solderless connector (not shown) having no partition 71 between the pressure welding terminals 73, wherein the electric wire 70 should have been guided by the partition 71 from the lower end of the wire guides 68 to the pressure welding terminal 73.

SUMMARY OF THE INVENTION

An object of the present invention is to provide a pressure welding means which eliminates the aforementioned bothersome work of changing a pressure welding blade according to many kinds of electric wires and ensures perfect pressure welding of a double-sided solderless connector by preventing a deflection thereof caused by a given pressure and further ensures to guide an electric wire in case of a solderless connector lacking a partition between pressure welding terminals.

To achieve the above objective, the present invention adopts a pressure welding apparatus wherein a plurality of applicators having various wire pressure welding blades and connector support blades with a mechanism movable in up and down directions are arranged radially and rotatively around a rotary shaft enabling the operator to select said wire pressure welding blade and said connector support blade through rotary operation of said applicator. It is possible to arrange a plurality of said rotatable applicators symmetrically with respect to a double-sided solderless connector.

Further, the present invention provides a pressure welding method wherein a wire pressure welding blade and a connector support blade with a mechanism movable in up and down directions are arranged opposite to each other on both sides of a double-sided solderless connector and an electric wire is pressure-welded to one side of said double-sided solderless connector by said wire pressure welding blade, while the other side of said double-sided solderless connector is supported by said connector support blade. Still further, the present invention provides a pressure welding method, wherein a pair of wire guides are arranged on both sides of a wire pressure welding blade and an electric wire is pressure-welded along said wire guides to a pressure welding terminal in a solderless connector by said wire pressure welding blade, that said wire guides are vertically movable and, at the time of pressure welding, a pair of wire guides are closely located on both sides of said pressure welding terminal on a bottom wall of said solderless connector, also making the ends thereof contact with said bottom wall.

BRIEF DESCRIPTION OF THE DRAWINGS

The present invention will be described in further detail with reference to the accompanying drawings, in which.

DETAILED DESCRIPTION OF THE PREFERRED EMBODIMENT

Figure 1:
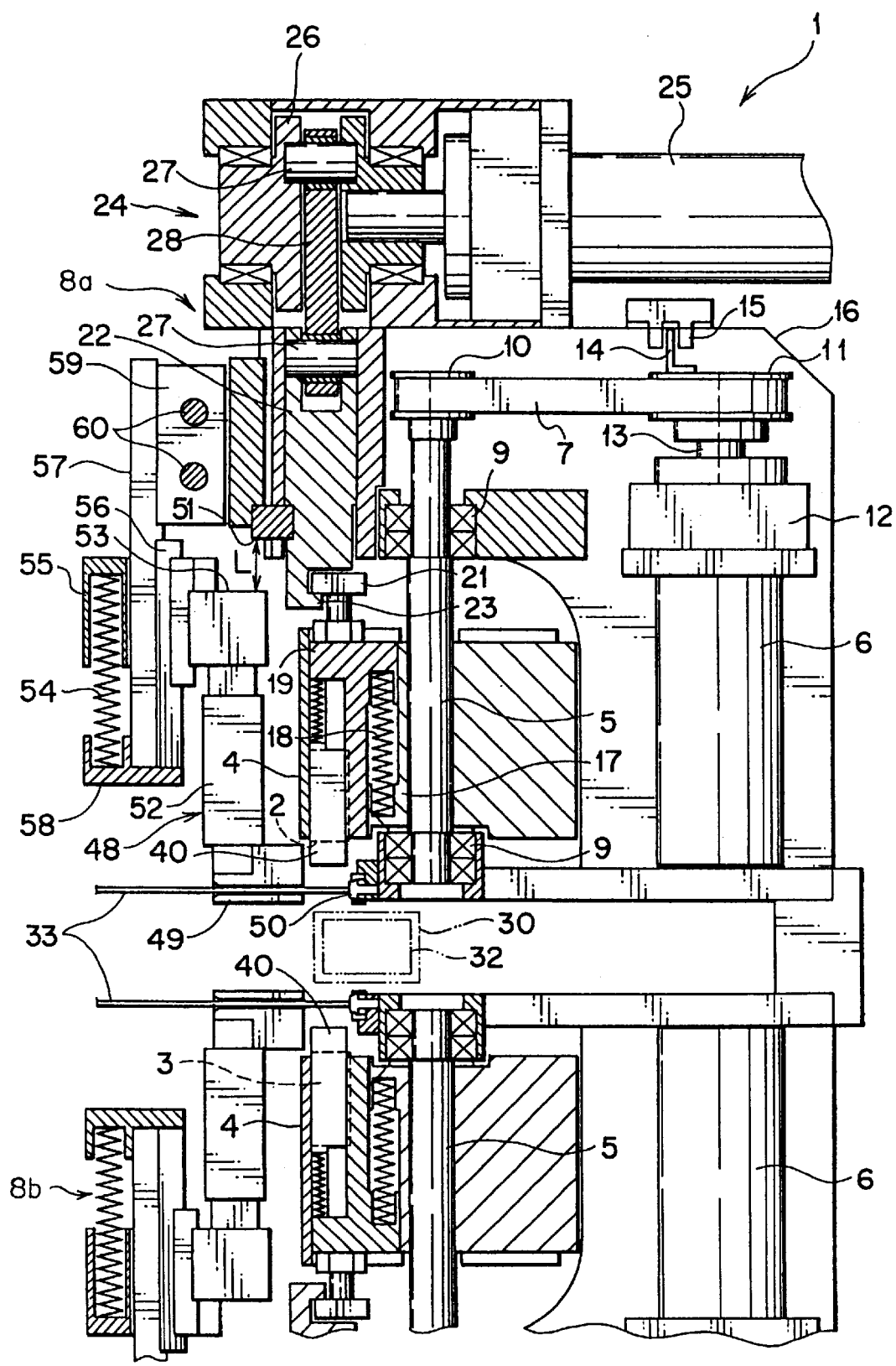
FIG. 1 is a partially cross-sectional side view of a pressure welding apparatus according to an embodiment of the present invention.
Figure 2:
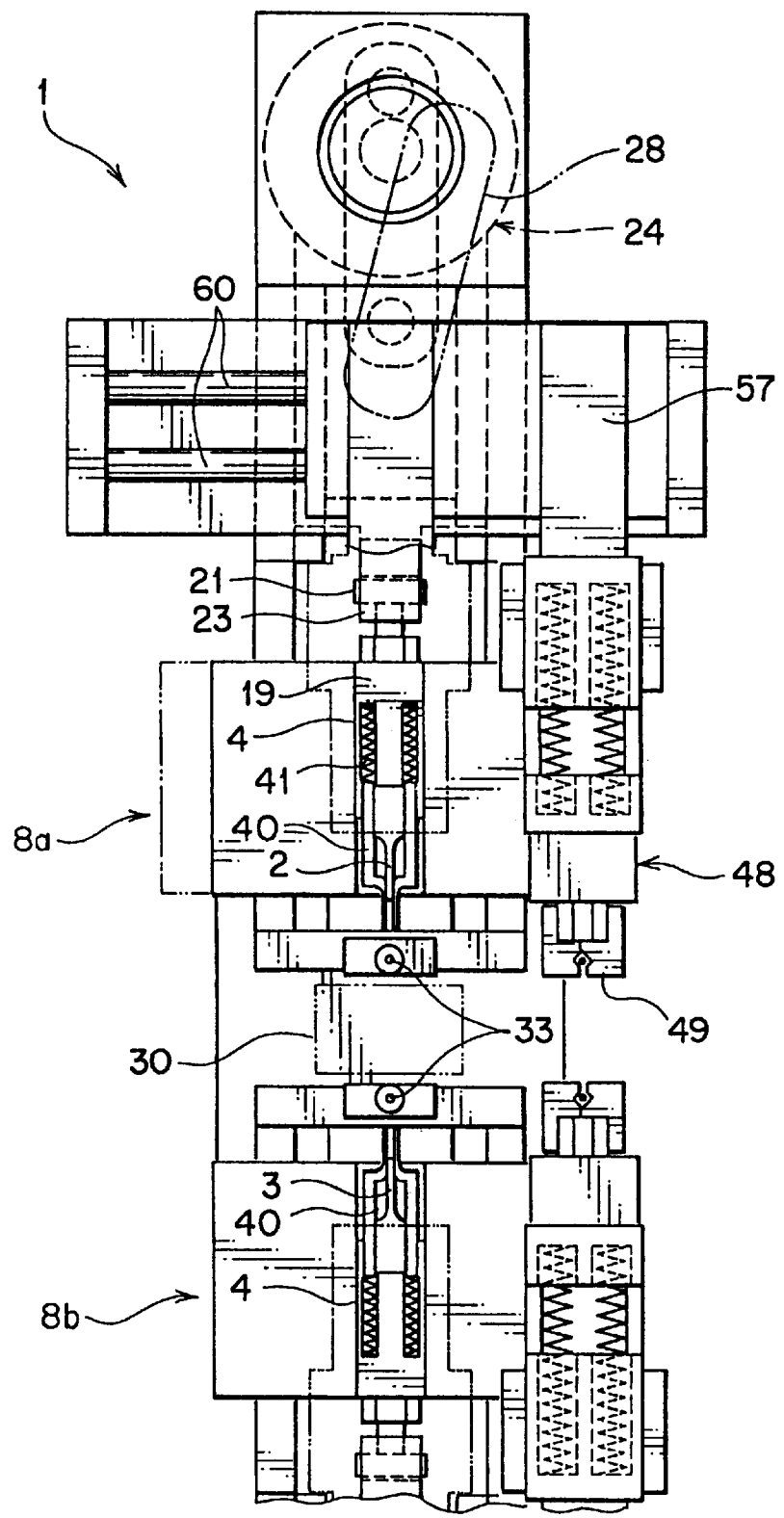
FIG. 2 is a front view of the pressure welding apparatus of FIG. 1.
Figure 3:
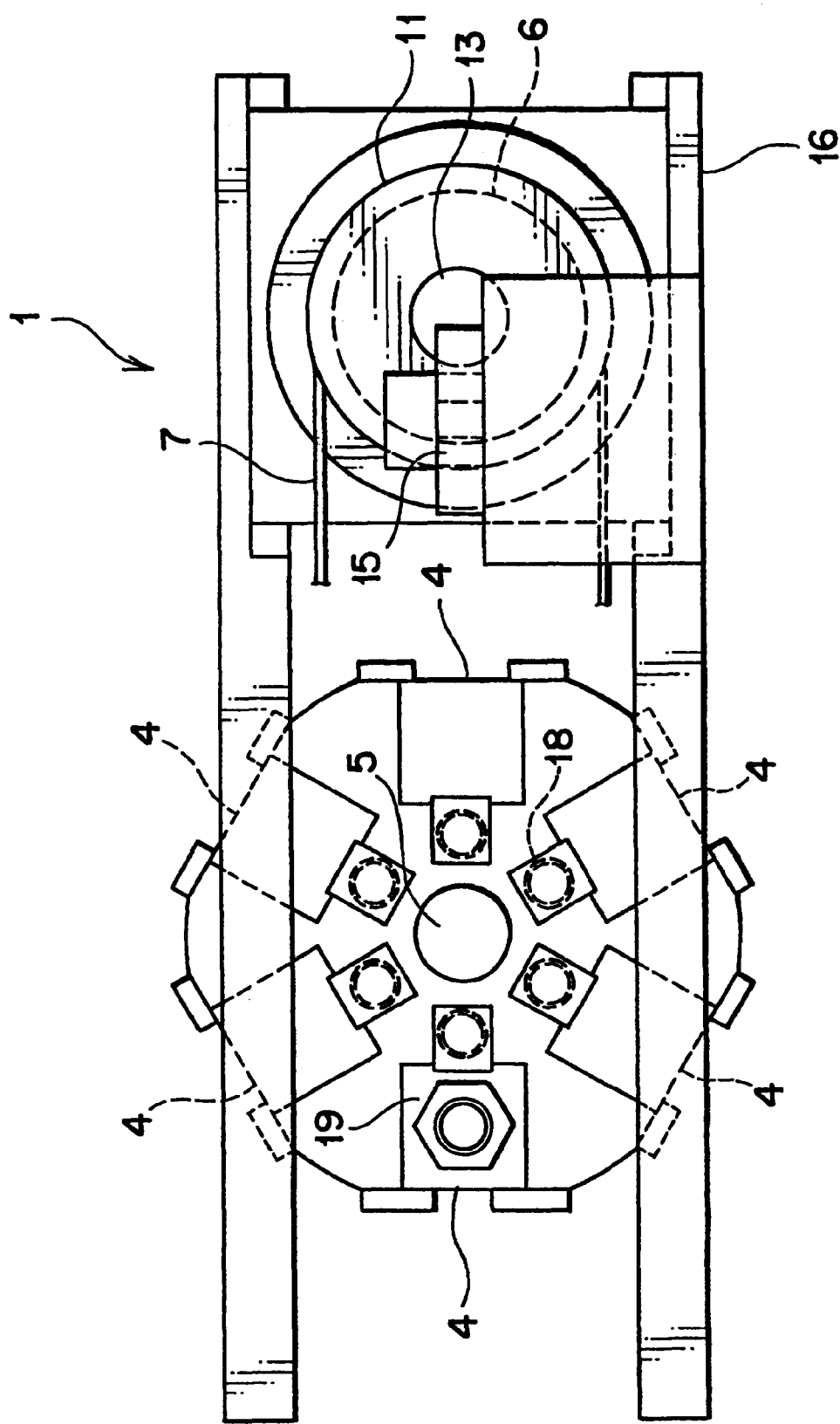
FIG. 3 is a plan view showing a rotary type applicator of the pressure welding apparatus of FIG. 1.

FIGS. 1 through 3 show an embodiment of a pressure welding apparatus according to the present invention.

The first feature of the pressure welding apparatus 1 is that a plurality of applicators (in this embodiment, six(6) per one side) 4 with various wire pressure welding blades (hereinafter referred to as "pressure welding blade") 2 and connector support blades (hereinafter referred to as "support blade") 3 are arranged radially around a rotary shaft 5 for enabling to suitably select an applicator 4 according to a wire-diameter by rotary operation of the shaft 5 with use of a servo-motor 6 and a timing belt 7.

According to the present embodiment, pressure welders 8a and 8b are arranged symmetrically in a vertical direction. A vertically symmetric structure has been disclosed in Japanese Patent Publication No. Heisei 8-124967. As shown in FIG. 1, the shaft 5 is set vertically and is supported by bearings 9 at both an intermediate portion and the base-end and has a small pulley 10 fixed on the other shaftend. The small pulley 10 is connected, with said timing belt 7, to a large pulley 11 of the servo-motor 6. The large pulley 11 is fixed to an output shaft 13 of a reduction gear 12 of the servo-motor 6. The large pulley 11 has a projection 14 for indicating a starting point, and a micro-photosensor 15 for detecting said projection 14 is provided on an apparatus frame 16. Setting of the starting point of rotating position of the applicator 4 is performed by using the sensor 15.

A slide guide 17 is fixed on said shaft 5, and a slider 19 having the pressure welding blade 2 or the support blade 3 is engaged movably in a vertical direction with the slide guide 17 by means of a coil spring 18.

Figure 4:
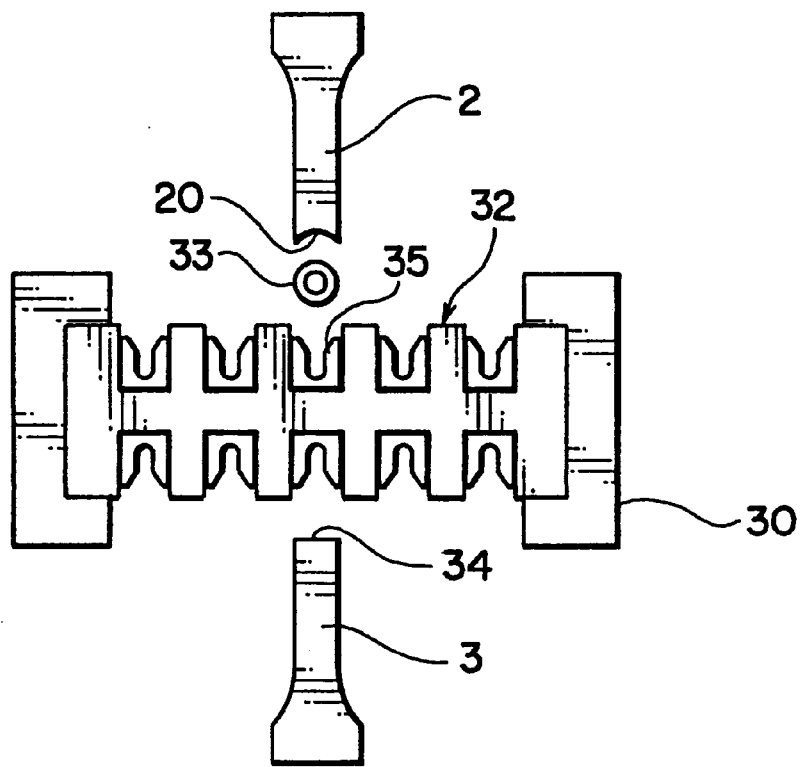
FIG. 4 is a front view showing a pressure welding method with a support blade.
Figure 5:
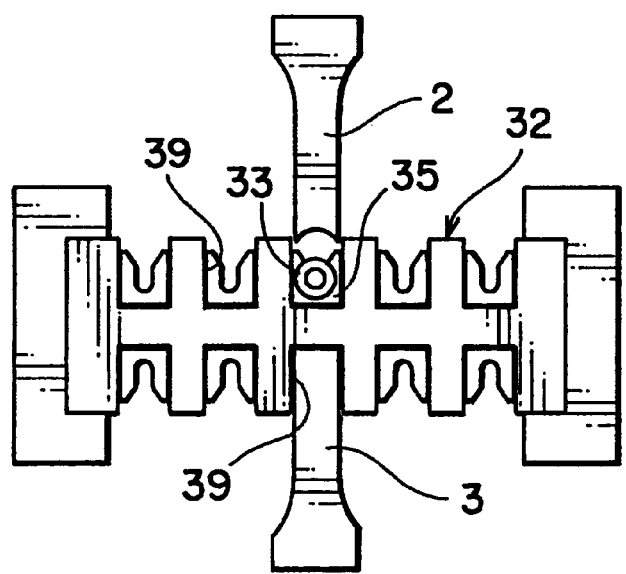
FIG. 5 is a front view showing a state of the pressure welding of FIG. 4.

As shown in FIG. 2, the support blade 3 of the lower pressure welder 8b is located opposite to the pressure welding blade 2 of the upper pressure welder 8a, or the pressure welding blade (2) of the lower pressure welder 8b can be located opposite to the support blade (3) of the upper pressure welder 8a. This point is the second feature of the pressure welding apparatus 1. A difference between the pressure welding blade 2 and the support blade 3 is an existence of a bent surface at the end as shown in FIGS. 4 and 5. It is acceptable on the upper pressure welder 8a to attach the pressure welding blade 2 to one applicator 4 (shown in FIG. 1) and to attach the support blade 3 to another applicator 4. For example, three kinds of pressure welding blades 2 and three kinds of support blades 3 can be arranged. This is the same for the lower pressure welder 8b. This enables to select any of the pressure welding blade 2 and the support blade 3 according to a wire-diameter by rotating the applicator 4.

Referring to FIGS. 1 and 2, the pressure welding blade 2 or the support blade 3 is fixed to respective slider 19, and a shank portion 21 fixed on the top of the slider 19 is engaged with a claw 23 of a primary slider 22. The primary slider 22 is driven up and down by a motor 25 located on the top of the apparatus by means of a crank mechanism 24 including a flywheel 26, a connecting pin 27 and a connecting rod 28. Said slider 19 is located at the top dead point by being pushed upward by the coil spring 18. The slider 19 descends by being pushed by the primary slider 22.

A connector holding beam 30 is placed between the upper and lower pressure welders 8a and 8b, and a plurality of solderless connectors 32 are arranged in parallel on said holding beam 30. This structure has been also disclosed in Japanese Patent Publication No. Heisei 8-124967.

FIGS. 4 and 5 show a state (method) of pressure welding connection of an electric wire 33 by the pressure welding blade 2 and the support blade 3 to a double-sided solderless connector 32 held by the holding beam 30. The bent surface 20 corresponding to a wire-diameter is formed at the end of the pressure welding blade 2 and a horizontal plane 34 is formed at the end of the support blade 3.

Upon performing the pressure welding, as shown in FIG. 5 the lower support blade 3 enters into a receiving chamber 39 of the solderless connector 32 and makes contact with a bottom of connector to support the solderless connector 32 without a deflection. Next or at the same time, the upper pressure welding blade 2 pressure-welds the electric wire 33 to a pressure welding terminal 35 in the solderless connector 32. The pressure welding of the electric wire 33 is surely performed without deficiency of pressing since the solderless connector 32 does not bend downward at wire's pressure welding because of supporting the solderless connector 32 by the support blade 3 from below.

Figure 7:
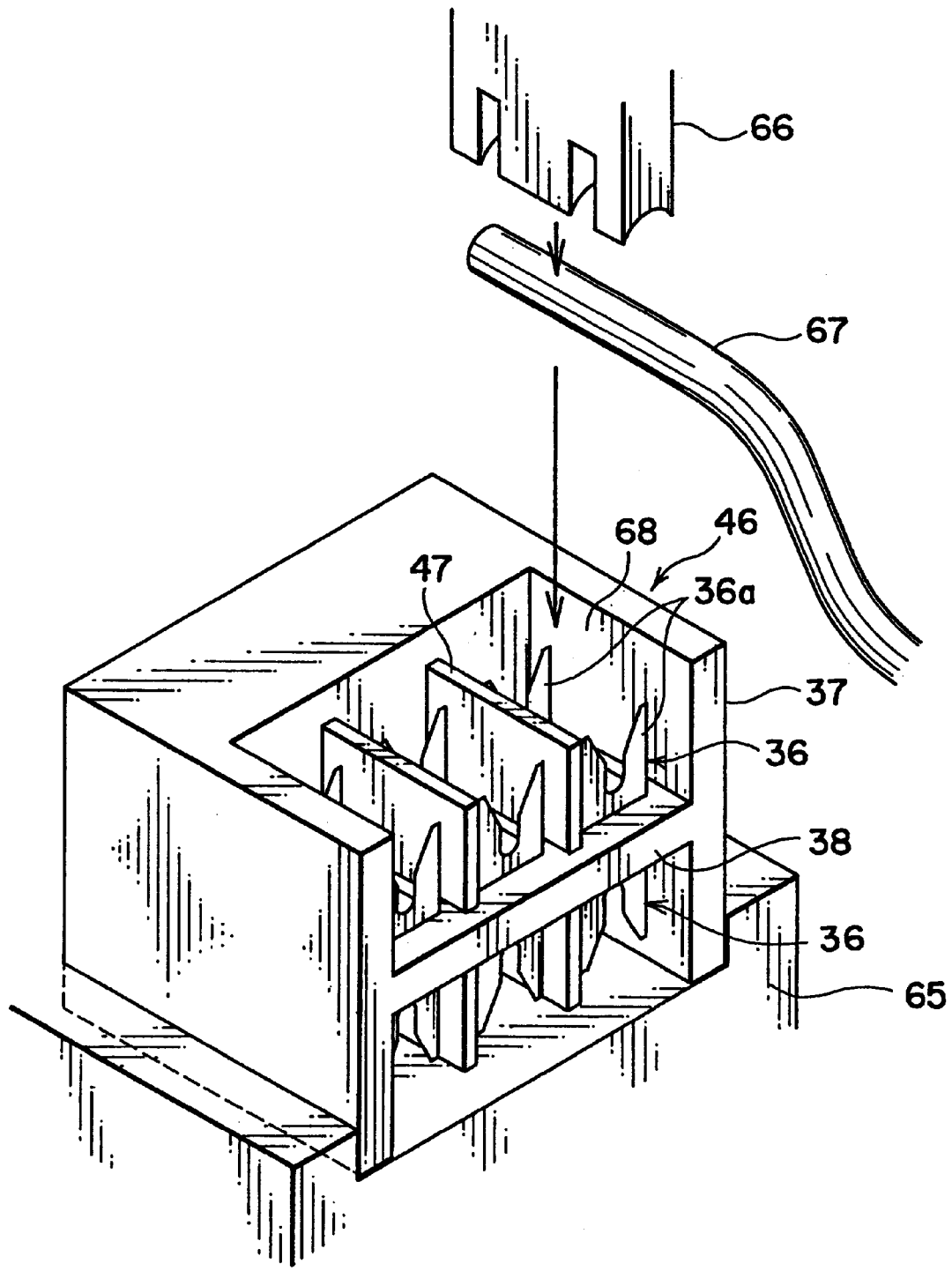
FIG. 7 is an exploded perspective view showing a conventional pressure welding method.
Figure 8:
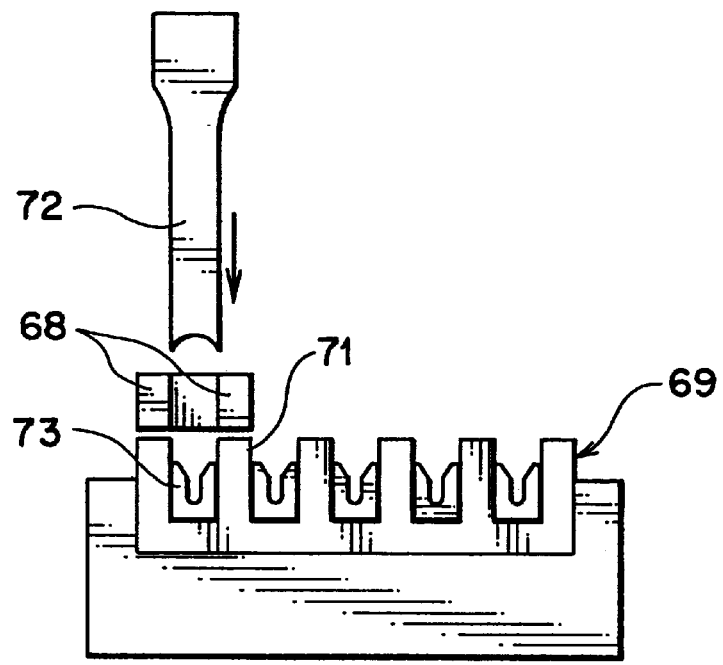
FIG. 8 is a front view showing a pressure welding method with a conventional wire guide.
Figure 9:
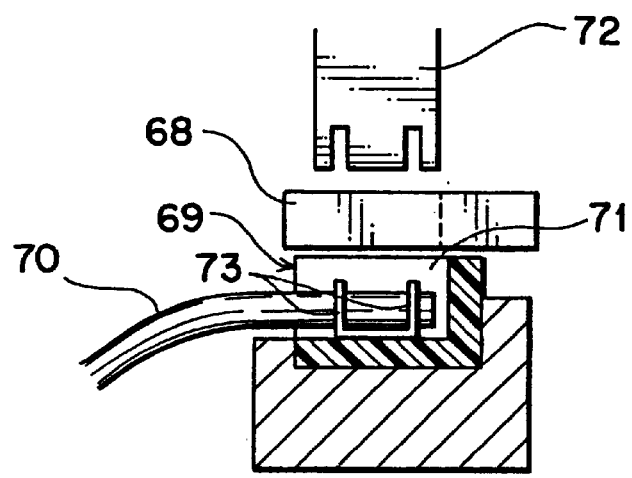
FIG. 9 is a partially cross-sectional side view of the pressure welding method of FIG. 8.

The support blade 3 could be of platelike or columnlike, and for example it supports a portion between the front and rear pressure welding portions 36a of a pressure welding terminal 36 or directly supports a bottom wall (a partition) 38 of a connector housing 37 of FIG. 7. Driving of the support blade 3 and that of the pressure welding blade 2 are done by vertical movement of the slider 19 shown in FIG. 2. It is effective to make the vertical movement of the support blade 3 and the pressure welding blade 2 simultaneously for eliminating a time loss. After completion of the pressure welding of electric wires to the upper receiving chambers 39 of the solderless connector 32 shown in FIGS. 4 and 5, the pressure welding of electric wires to the lower receiving chambers 39 is performed following a setting of the support blade 3 on the upper side and the pressure welding blade 2 on the lower side by rotating the upper and lower applicators 4 shown in FIG. 1.

As shown in FIGS. 2 and 6, a pair of wire guides 40 are arranged movably in a vertical direction on both sides of the pressure welding blade 2. Said wire guides 40 are pushed toward the connector by a coil spring 41 as shown in FIG. 2 and are supported movably and vertically in the slider 19 by means of the coil spring 41. The wire guides 40 have a vertically straight sheet portion 40a with almost the same width as the pressure welding blade 2 as shown in FIGS. 1, 6A and 6B. Said wire guides 40 have been disclosed in Japanese Patent Publication No. Heisei 8-124967, but the present embodiment is characterized by a pressure welding method shown in FIG. 6B, wherein said wire guides 40 also function as a partition between each pressure welding terminal 43 in the solderless connector 42. This is the third feature of the present invention.

Figure 6A:
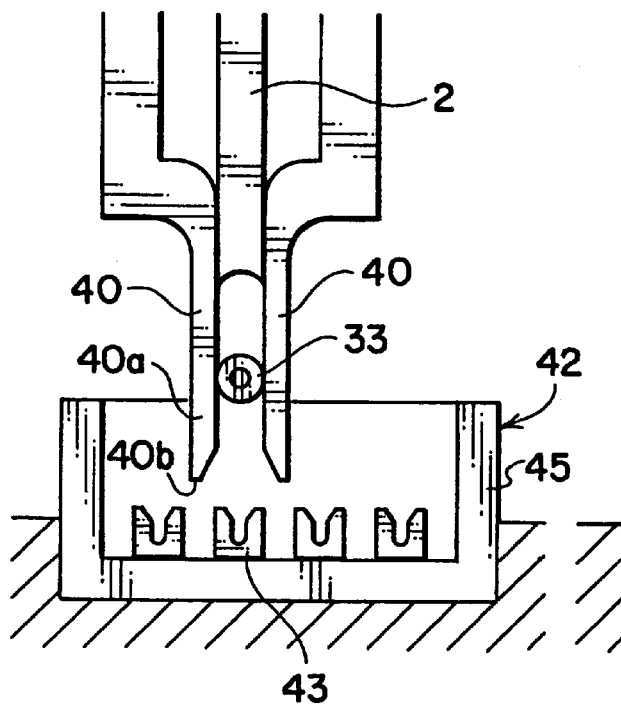
FIGS. 6A, 6B, 6C and 6D are front views showing a pressure welding method with wire guides.
Figure 6B:
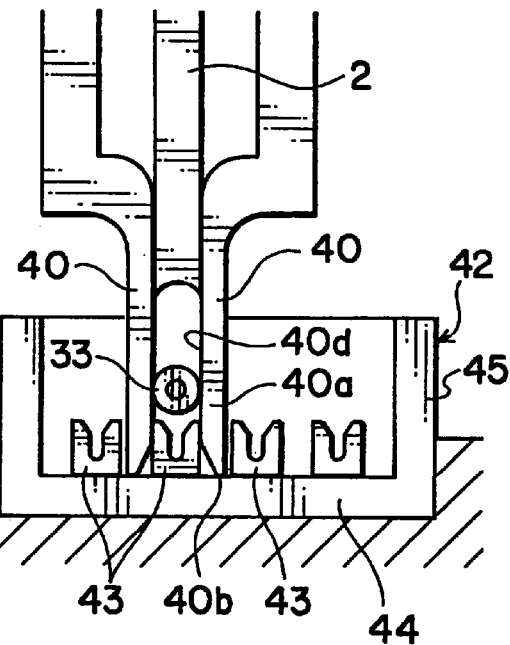

That is, as shown in FIG. 6A, firstly the electric wire 33 is located over the pressure welding terminal 43, and the pair of wire guides 40 are located on both sides of the electric wire 33, and the pressure welding blade 2 is located between the pair of wire guides 40. Secondly, as shown in FIG. 6B, the electric wire 33, the wire guides 40 and the pressure welding blade 2 are descended as a unit according to a descent of the slider 19 shown in FIG. 2, and the wire guides 40 are inserted into spaces between the adjacent pressure welding terminals 43, and then wire guide ends 40b make contact with a housing bottom wall 44 of the solderless connector 42. The pair of wire guides 40 are closely located on both sides of the pressure welding terminal 43. A vertically long guide plane 40d is formed at the inside of the sheet portion 40a of the wire guide 40, and the long sheet portion 40a guides the electrical wire 33 to the pressure welding terminal 43 even if housing side walls 45 of the solderless connector 42 are high.

Figure 6C:
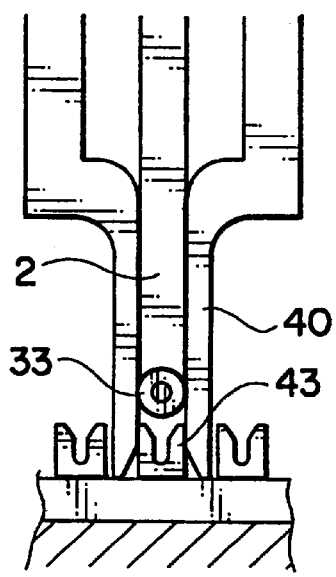
Figure 6D:
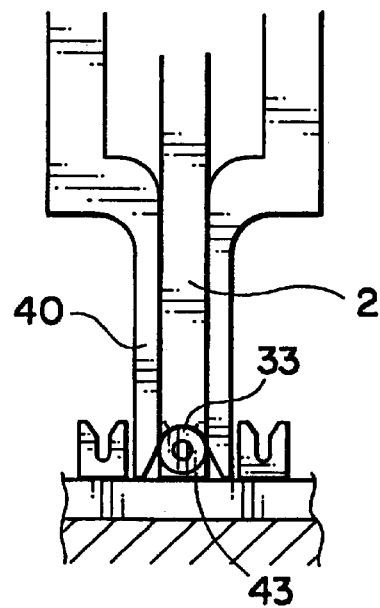

Next, the pressure welding blade 2 is descended as shown in FIG. 6C, compressing the coil spring 41 shown in FIG. 2, and pressure-welds the electric wire 33 to the pressure welding terminal 43 as shown in FIG. 6D. The electric wire 33 is surely guided to the pressure welding terminal 43 since the pair of wire guides 40 also function as partitions as shown in FIGS. 6C and 6D in case a partition 47 in a solderless connector 46 shown in FIG. 7 is not provided.

An example wherein the wire guide 40 also functions as a connector support is shown in Japanese Patent Publication No. Heisei 8-124967.

Referring to FIG. 1, wire chuck portions 48 are located facing each other in front of the pressure welding blade 2, and the end of the electric wire 33 held by a pair of chuck claws 49 is pressure-welded to the solderless connector 32 by the pressure welding blade 2. In FIG. 1, the motor 25 is driven by turning on a wire detecting switch 50. The wire chuck portion 48 is descended as a unit with the primary slider 22 by a bump of a cylinder head 53 of a chuck cylinder 52 against a bumping projection 51 of the primary slider 22. A distance L between the bumping projection 51 and the cylinder head 53 equals to a distance between the electric wire 33 and the pressure welding blade 2. The wire chuck portion 48 ascends as a unit with the primary slider 22 by being pushed by the coil spring 54.

Said chuck portion 48 consists of the chuck cylinder 52 for opening or closing the pair of chuck claws 49, a spring holder 55 integrated with the cylinder head 53, a vertical guide 56 for vertically guiding the sliding of the chuck cylinder 52, a chuck stay 57 holding, said vertical guide 56 and standing upward, and the coil spring 54, which is flexibly set between a stay lower portion 58 and the spring holder 55, for pushing the chuck cylinder 52 up to the top dead point.

Said chuck stay 57 is fixed to a horizontal slider 59, and said horizontal slider 59 can horizontally move along two(2) horizontal guide bars 60 as shown in FIG. 2. A pair, right and left, of said wire chuck portions 48 are provided, and each chuck stay 57 is integrally fixed to the horizontal slider 59.

In case one chuck portion 48 is located at the center of the guide bar 60, that is, in front of the pressure welding blade 2, the other chuck portion 48 is located at the end of the guide bar 60 for enabling to receive the electric wire 33 from a worker. A structure of the chuck has been disclosed in Japanese Patent Publication No. Heisei 8-124967.

According to the present invention, as previously described, selection of the pressure welding blade and the support blade can be done by rotating the applicator, which increases productivity by eliminating time consuming conventionally required for changing the pressure welding blade or the support blade according to a kind (diameter) of electric wire. And, a speedy changeover of the pressure welding blade and the support blade arranged up and down can be done for dealing with the double-sided solderless connector. Also, sure pressure welding can be performed by preventing a deflection of the solderless connector causing from a given pressure. Further, sure guiding and sure pressure welding of an electric wire can be performed for a solderless connector having no partition between pressure welding terminals.

What is claimed is:

1. A method of pressure-welding electric wires comprising the steps of:

setting a pair of vertically movable wire guides on both sides of a pressure welding blade;

locating said wire guides closely on both sides of a pressure welding terminal on a bottom wall of a double-sided solderless connector, at the same time, making the ends of said wire guides contact with said bottom wall; and pressure-welding respective electric wires, as being guided along said wire guides, to said pressure welding terminals in said solderless connector with said pressure welding blade.

2. A method of pressure-welding electric wires comprising the steps of:

selecting a pressure welding blade and support blade mounted on a plurality of applicators arranged radially at upper and lower sides of a double-sided solderless connector according to a kind of the double-sided solderless connector by rotary operation of said applicators; and pressure-welding respective electric wires to terminals in said solderless connector by driving up and down the selected pressure welding blade and support blade.

* * * * *